United States Patent
Shiraishi et al.

(10) Patent No.: US 9,213,346 B2
(45) Date of Patent: Dec. 15, 2015

(54) MULTIPHASE SWITCHING POWER SUPPLY CIRCUIT

(71) Applicant: KABUSHIKI KAISHA TOSHIBA, Minato-ku, Tokyo (JP)

(72) Inventors: Kei Shiraishi, Tokyo (JP); Takeshi Ueno, Kawasaki (JP); Taichi Ogawa, Tokyo (JP); Tetsuro Itakura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 444 days.

(21) Appl. No.: 13/737,429

(22) Filed: Jan. 9, 2013

(65) Prior Publication Data

US 2013/0214751 A1 Aug. 22, 2013

(30) Foreign Application Priority Data

Feb. 21, 2012 (JP) ................................. 2012-035364

(51) Int. Cl.
G05F 1/46 (2006.01)
H02M 3/158 (2006.01)

(52) U.S. Cl.
CPC ............... *G05F 1/46* (2013.01); *H02M 3/1584* (2013.01)

(58) Field of Classification Search
CPC .......... G05F 1/46; G05F 1/462; H02M 3/156; H02M 3/158; H02M 3/1584; H02M 2003/1586
See application file for complete search history.

(56) References Cited

U.S. PATENT DOCUMENTS

| | | | |
|---|---|---|---|
| 6,362,608 B1* | 3/2002 | Ashburn et al. | 323/272 |
| 7,005,835 B2* | 2/2006 | Brooks et al. | 323/282 |
| 2007/0075691 A1* | 4/2007 | Burstein et al. | 323/272 |
| 2010/0141230 A1* | 6/2010 | Lukic et al. | 323/283 |
| 2013/0049712 A1* | 2/2013 | Ueno | 323/234 |

OTHER PUBLICATIONS

Japanese Office Action dated Jun. 20, 2014 in counterpart Japanese Application No. 2012-035364.
O. Garcia et al: "Digital-Control-Based Solution to the Effect of Nonidealities of the Inductors in Multiphase Converters": IEEE Transactions on Power Electronics: vol. 22, No. 6: Nov. 2007: pp. 2155-2163. (In English).

* cited by examiner

*Primary Examiner* — Jessica Han
(74) *Attorney, Agent, or Firm* — Holtz, Holtz, Goodman & Chick PC

(57) ABSTRACT

There is provided a multiphase switching power supply circuit in which an input terminal receives an input voltage, an output terminal outputs an output voltage, first to an Nth power stages each include an inductor having one end connected to the output terminal; a high-side switch that connects another end of the inductor to the input terminal; and a low-side switch that connects the other end of the inductor to a reference voltage, a switch signal controller supplies first to an Nth control signals to the first to Nth power stages, the first to Nth control signals complementarily turning on and off their corresponding high-side switches and low-side switches at a frequency fs, and a switch signal controller determines phases of the first to Nth control signals according to a ration between inductance values of the inductors included in the first to Nth power stages.

10 Claims, 7 Drawing Sheets

MULTIPHASE SWITCHING POWER SUPPLY CIRCUIT

CROSS REFERENCE TO RELATED APPLICATIONS

This application is based upon and claims the benefit of priority from the prior Japanese Patent Application No. 2012-35364 filed on Feb. 21, 2012, the entire contents of which are incorporated herein by reference.

FIELD

Embodiments described herein relate to a multiphase switching power supply circuit.

BACKGROUND

Multiphase power supply technology is widely used in applications that output high current. Normally, the phases of an N-phase multiphase configuration operate such that the phases are shifted by $2\pi/N$ [rad] relative to each other. Hence, an N-phase multiphase power supply circuit in which the switch frequency for each phase is fs performs the same operation as a single-phase power supply with a switch frequency of Nfs. Therefore, there are advantages such as an improvement in response speed to load change and a reduction in ripple amplitude. On the other hand, the major drawback is the influence caused by mismatch.

Normally, in the case of an ideal N-phase multiphase DC-DC converter, as the frequency characteristics of an output signal, a spurious component is observed in Nfs frequency component and waves of the Nfs frequency component. That is, an fs component which is a switch frequency for each phase is cancelled out when adding currents for each phase and thus the spurious component is not observed in an output voltage.

However, in a realistic multiphase power supply, there is a mismatch of the order of up to 20% between inductance values for the respective phases. Due to this influence, an fs component is not cancelled out when adding currents for each phase, and thus, the fs component remains in an output signal. In addition, since this low-frequency component is less likely to be influenced by an LC low-pass filter at a subsequent stage, strong spurious components are observed.

A technique for solving this problem is conventionally presented. The technique is such that an inductance for each phase is measured in advance, and two phases whose inductance values are close to each other are rearranged in a reverse phase relationship. Specifically, when the inductance values for two phases are the same or close to each other and are different from the inductance values for the other phases, the configuration is arranged such that these two phases have the reverse phase relationship. By this, the phases shifted by 180 degrees cancel each other out (the ripple for the phases on opposite sides is canceled out), reducing an fs component in an output voltage. By this, an fs component in an output signal can be reduced. This method, however, has a problem that the fs component cannot be sufficiently removed, depending on the difference in inductance value between the two phases (the amount of mismatch). In addition, there is another problem that when only the inductance value for one phase is different from the inductance values for the other phases, an effect cannot be obtained.

As such, the above-described conventional art proposes a technique for solving the problem that a spurious low-frequency component is observed in an output signal. However, there are many cases in which an fs component cannot be sufficiently removed, depending on the amount of mismatch. In addition, there is a problem that an effect is not brought about when only the inductance for one phase is different from the inductance values for the other phases.

DETAILED DESCRIPTION

According to some embodiments, there is provided a multiphase switching power supply circuit that converts an input voltage to an output voltage different than the input voltage, including: an input terminal, an output terminal, a first to an Nth (N being an integer greater than 2) power stages and a switch signal controller.

The input terminal receives the input voltage.

The output terminal outputs the output voltage.

The first to an Nth power stages each include an inductor having one end connected to the output terminal; a high-side switch that connects another end of the inductor to the input terminal; and a low-side switch that connects the other end of the inductor to a reference voltage.

The switch signal controller supplies first to an Nth control signals to the first to Nth power stages, the first to Nth control signals complementarily turning on and off their corresponding high-side switches and low-side switches at a frequency fs.

The switch signal controller determines phases of the first to Nth control signals according to a ration between inductance values of the inductors included in the first to Nth power stages.

Hereinafter, embodiments will be described in detail with reference to the drawings.

In this specification, examples using a three-phase multiphase DC-DC converter, particularly, a buck converter, will be described. Note, however, that the embodiments are not limited thereto, and can also be applied to other switching power supply circuits such as step-up DC-DC converters, step-down DC-DC converters, and AC-DC converters. In addition, the embodiments can also be applied to a four-or-more-phase multiphase power supply circuit.

First Embodiment

Figure 1:
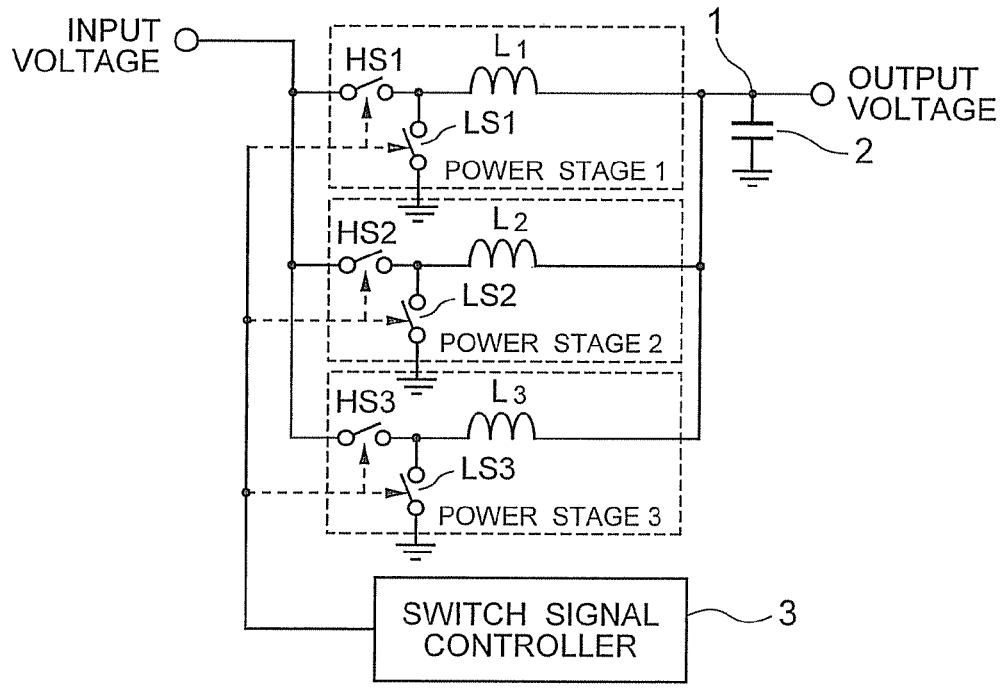
FIG. 1 is a diagram illustrating a basic configuration of a three-phase multiphase DC-DC converter according to an embodiment.

FIG. 1 illustrates a schematic configuration of a DC-DC converter according to an embodiment. FIG. 1 illustrates an example of a three-phase multiphase configuration having three power stages 1, 2, and 3 connected in parallel with one another.

The power stages respectively include inductors L1, L2, and L3 each having one end connected to an output voltage; high-side switches HS1, HS2, and HS3 that connect the other end of their respective corresponding inductors L1, L2, and L3 to an input voltage; and low-side switches LS1, LS2, and LS3 that connect the other end of their respective corresponding inductors L1, L2, and L3 to a ground (reference voltage).

One end of each of the high-side switches HS1, HS2, and HS3 is connected to the input voltage, and the other end of each of the high-side switches HS1, HS2, and HS3 is connected to the other end of its corresponding inductor L1, L2, or L3. One end of each of the low-side switches LS1, LS2, and LS3 is connected to the ground, and the other end of each of the low-side switches LS1, LS2, and LS3 is connected to the other end of its corresponding inductor L1, L2, or L3.

A high-side switch and a low-side switch complementarily operate at a frequency fs. When the high-side switch is on, the inductor current increases, and when the high-side switch is off, the inductor current decreases.

The duty ratios and phases of switch signals (control signals) for the respective phases are generated by a switch signal controller 3. For example, all phases have the same duty ratio and the phases are shifted by a predetermined width relative to each other. In addition, one end of a smoothing capacitor 2 is connected to an output terminal 1, and the other end of the smoothing capacitor 2 is connected to a ground.

Figure 2:
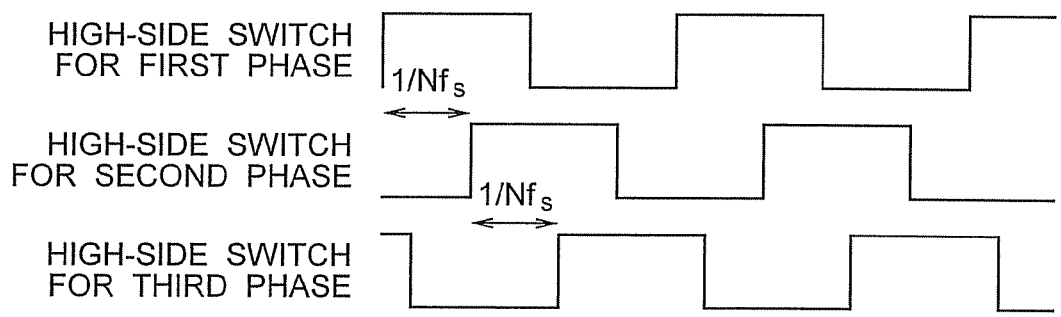
FIG. 2 is a diagram illustrating the time waveforms of high-side clocks for respective phases in a conventional technique.

FIG. 2 illustrates control signals for high-side switches included in respective phases in a conventional technique. When the control signal for the high-side switch is at a high level, the high-side switch is turned on and the low-side switch is turned off. Conventionally, in the case of a three-phase multiphase power supply, switch signals for the respective phases are input such that the phases of the switch signals are shifted uniformly by $2\pi/3$ relative to each other. When there is mismatch in inductance value between the phases, an fs component is not cancelled out when adding currents for each phase, and thus, the fs component remains in an output signal.

Figure 3:
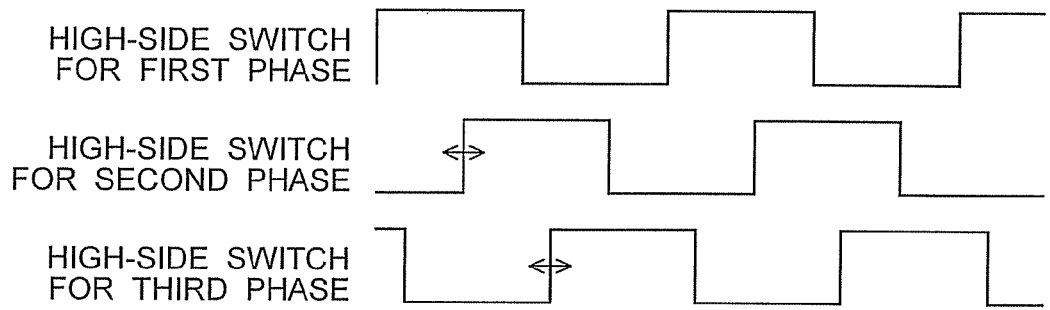
FIG. 3 is a diagram illustrating the time waveforms of high-side clocks for respective phases in the embodiment.

In the present proposition, as illustrated in FIG. 3, by minutely adjusting the phases of high-side switch control signals for the second and third phases, even if there is mismatch in inductance value between the phases, a switch frequency fs component is effectively removed or reduced from an output signal. An example of an adjustment is illustrated below using FIG. 4 illustrating a specific exemplary configuration of the DC-DC converter of FIG. 1.

Figure 4:
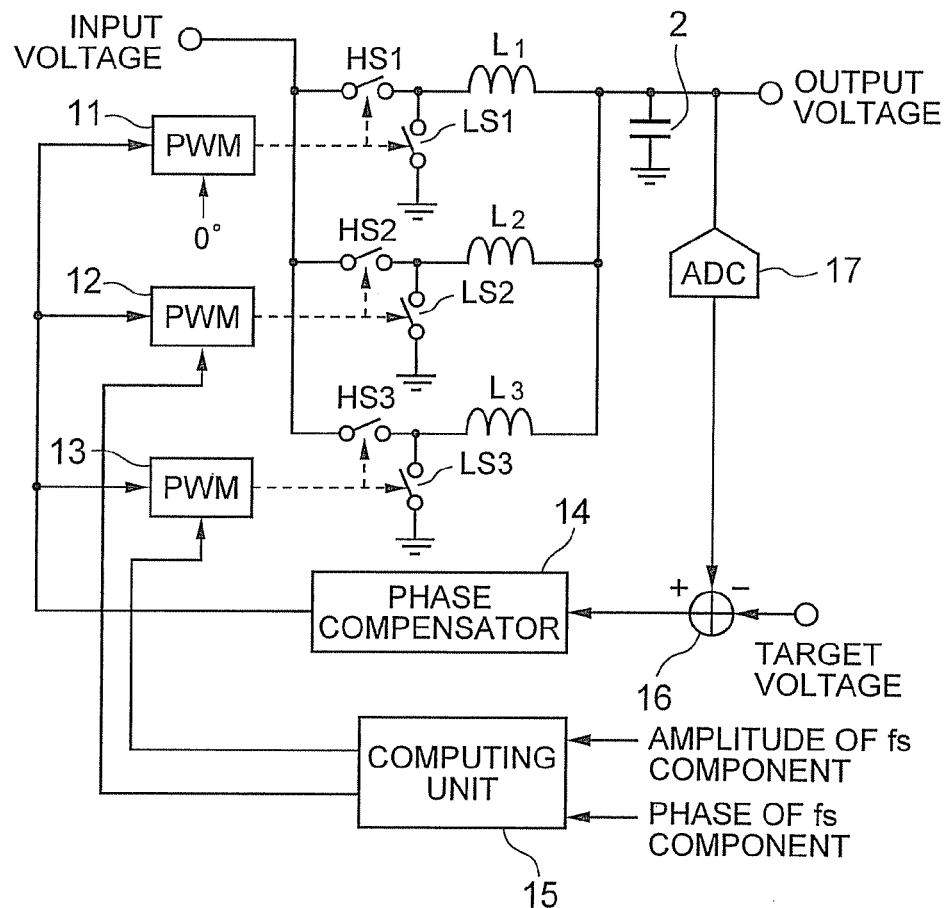
FIG. 4 is a diagram illustrating an exemplary configuration of a three-phase multiphase DC-DC converter according to a first embodiment.

FIG. 4 illustrates an exemplary configuration of a DC-DC converter according to a first embodiment. It is assumed that a ratio between inductance values for the respective phases (the respective power stages) is known.

A voltage at an output voltage terminal is detected by an ADC 17. A difference between the voltage at the output voltage terminal and a voltage at a target voltage terminal is detected by a difference unit 16. A difference signal is phase-compensated by a phase compensator 14, and the resulting signal is fed back to input terminals of PWM (Pulse Width Modulation) units 11, 12, and 13. By this feedback configuration, the voltage at the output voltage terminal can be controlled to the voltage at the target voltage terminal. Since an output voltage is digitized by the ADC 17, the phase compensator 14 is implemented by a digital circuit.

At this time, the phases of the PWM units 12 and 13 of the second and third phases are determined by a computing unit 15, based on the ratio between the inductance values for the respective phases. It is assumed that the phase of the PWM unit of the first phase is 0°.

It is assumed that a ratio between inductance values for the second and third phases with reference to the inductance value for the first phase are $A_{12}$ and $A_{13}$. The case is considered in which at this time the phases of control signals for switches HS2 and HS3 of the second and third phases are to be controlled. It is assumed that the phases for the second and third phases with reference to the first phase are $\phi_2$ and $\phi_3$, respectively. Note that since the switch HS2, HS3 and a switch LS2, LS3 complementarily operate, a control signal which is an inverted version of a control signal for the switch HS2, HS3 is provided to the switch LS2, LS3.

To remove a switch frequency fs component from an output signal, an X-direction component and a Y-direction component of a switch frequency fs component included in the sum of inductor currents (i.e., the sum of output currents from inductors L1 to L3) are set to 0. To do so, the following equations need to hold. Equation (1) is for the Y-direction component and Equation (2) is for the X-direction component.

$$\sin 0° + A_{12} \sin \phi_2 + A_{13} \sin \phi_3 = 0 \quad (1)$$

$$\cos 0° + A_{12} \cos \phi_2 + A_{13} \cos \phi_3 = 0 \quad (2)$$

By solving them, the phases $\phi_2$ and $\phi_3$ of control signals for the switches HS2 and HS3 included in the second and third phases are calculated as follows:

$$\phi_2 = \cos^{-1}\left(\frac{1 + A_{12}^2 - A_{13}^2}{2A_{12}}\right) \quad (3)$$

$$\phi_3 = \cos^{-1}\left(\frac{1 - A_{12}^2 + A_{13}^2}{2A_{13}}\right) \quad (4)$$

Namely, when the phases $\phi_2$ and $\phi_3$ for the second and third phases are adjusted to have the above-described values, the switch frequency fs component included in the sum of inductor currents can be removed. For example, when the preset phases for the second and third phases are $2\pi/3$ and $4\pi/3$, the phase for the second phase is adjusted by the difference between $\phi_2$ and $2\pi/3$, and the phase for the third phase is adjusted by the difference between $\phi_3$ and $4\pi/3$.

It can be seen that since the same equations as Equation (1) and Equation (2) can be set up regardless of the number of phases of the multiphase configuration, the phases to be controlled are only two phases.

Figure 5:
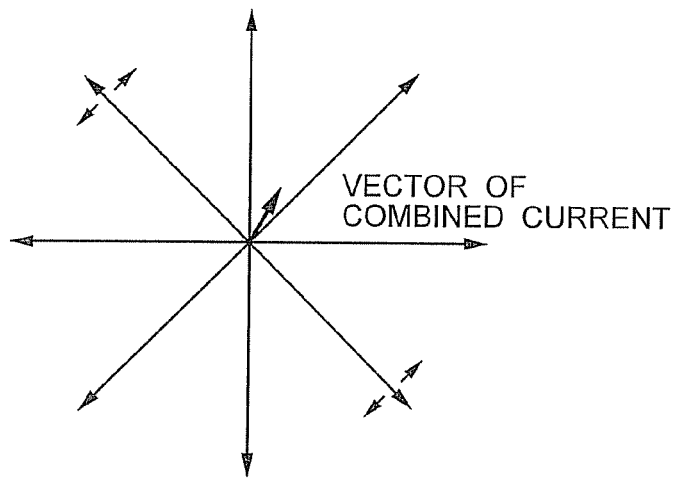
FIG. 5 is a vector diagram illustrating the amplitudes and phases of inductor currents for respective phases of an eight-phase multiphase power supply.

Now, an example of a preferred way to select two phases to be controlled is illustrated in FIG. 5. Here, an example of an eight-phase multiphase power supply is illustrated. A thin arrow in the drawing indicates the amplitude and phase of a switch frequency fs for each phase, and a thick arrow (combined vector) indicates the amplitude and phase of the sum thereof. At this time, phases whose angles formed with a phase of the combined vector are closest to 90 degrees, i.e., two phases illustrated in FIG. 5, are to be adjusted. By this, the fs component can be suppressed with a small phase adjustment width.

Although here two phases are to be controlled, it is also possible that three or more phases are to be controlled. In this case, too, equations can be set up in the same manner as the above, and a phase for each phase can be computed.

As described above, according to the present embodiment, even if there is mismatch in inductance value between the phases, a switch frequency fs component can be reduced or removed from an output signal. In addition, by this fact, the ripple amplitude of an output voltage can be reduced.

In addition, by controlling only the phases for two phases regardless of the number of phases of the multiphase configuration, an fs component can be easily reduced or removed.

In addition, an adjustment width for each phase is determined based on the ratio between inductance values for the phases, resulting in a simple configuration.

Second Embodiment

Figure 6:
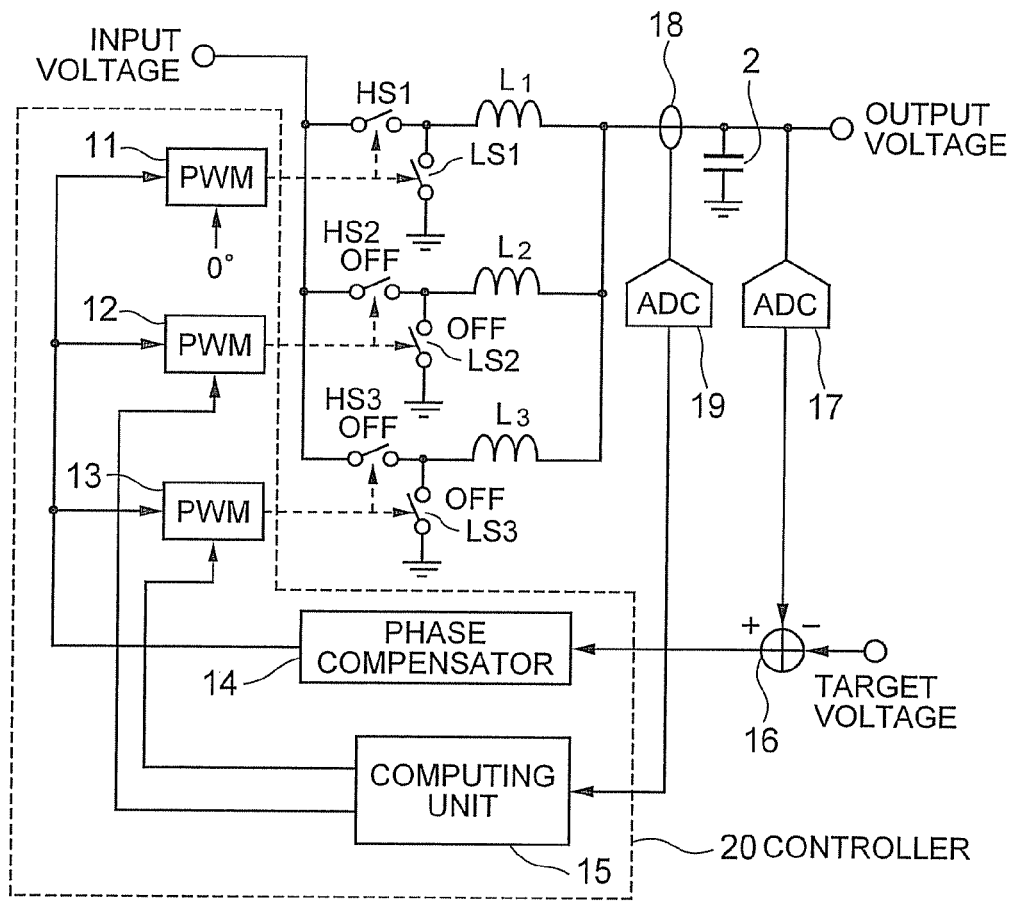
FIG. 6 is a diagram illustrating an exemplary configuration of a three-phase multiphase DC-DC converter according to a second embodiment.

FIG. 6 illustrates an exemplary configuration of a DC-DC converter according to a second embodiment. A current loop 18 and an ADC 19 are added to the configuration illustrated in FIG. 4. The same components as those in FIG. 4 are denoted by the same reference numerals.

In the present embodiment, inductor currents for respective phases are measured by allowing power stages to operate on a phase-by-phase basis. Specifically, only a power stage of one phase is allowed to operate in turn, and both high-side switches and low-side switches in the other power stages are turned off. Then, based on the inductor current values for the respective phases thus measured, a ratio between inductance values for the phases is determined.

The example illustrated in the drawing illustrates an operation performed when the first phase is to be measured. An output current from the power stage of the first phase is detected by the current loop 18, and the ADC 19 is operated to perform oversampling operation, by which the ripple amplitude of the current for the first phase is detected. The current value (ripple amplitude) detected by the current loop 18 is digitized by the ADC 19, and the digitized current value is provided to a computing unit 15. Therefore, the computing unit 15 is implemented by a digital circuit. The second and third phases are also measured in the same manner as that for the first phase. The computing unit 15 determines phases for the second and third phases from the ripple amplitudes for the respective phases, by which the phases of PWM units 12 and 13 are adjusted.

A method for calculating ratios $A_{12}$ and $A_{13}$ between inductance values in the present embodiment are as illustrated below. The amplitude of the current ripple for each phase is inversely proportional to the inductance value. Hence, when the measured values of the current ripple amplitudes for the respective phases are $\Delta i_{pp1}$, $\Delta i_{pp2}$, and $\Delta i_{pp3}$, $A_{12}$ and $A_{13}$ have the following values:

$$A_{12} = \Delta i_{pp1}/\Delta i_{pp2} \tag{5}$$

$$A_{13} = \Delta i_{pp1}/\Delta i_{pp3} \tag{6}$$

By substituting these values into Equation (1) and Equation (2), phases for the second and third phases can be calculated.

As described above, according to the present embodiment, since output currents from the power stages are measured individually, ratios $A_{12}$ and $A_{13}$ between inductance values can be computed. Thus, phases for the second and third phases can be calculated.

Third Embodiment

Figure 7:
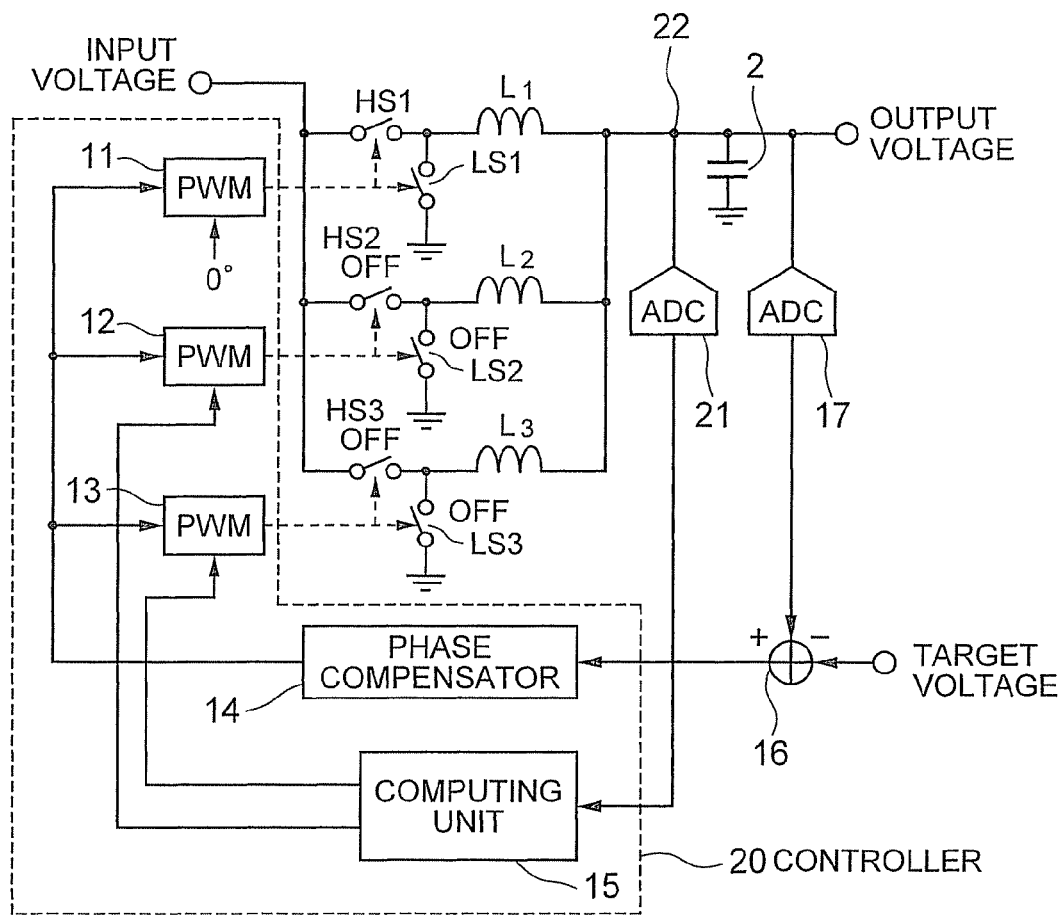
FIG. 7 is a diagram illustrating an exemplary configuration of a three-phase multiphase DC-DC converter according to a third embodiment.

FIG. 7 illustrates an exemplary configuration of a DC-DC converter according to a third embodiment. A voltage loop 22 and an ADC 21 are added to the configuration illustrated in FIG. 4. The same components as those in FIG. 4 are denoted by the same reference numerals.

The present embodiment illustrates the case in which a ratio between inductance values is measured based on output voltages from respective phases (respective power stages).

Specifically, output voltages from the respective phases are measured by allowing the power stages to operate on a phase-by-phase basis. That is, only a power stage of one phase is allowed to operate in turn, and both high-side switches and low-side switches in the other power stages are turned off. Then, based on the output voltages from the respective phases thus measured, a ratio between inductance values for the phases is determined.

The example illustrated in the drawing illustrates an operation for the case in which the first phase is to be measured. An output voltage is measured by the voltage loop 22, and the ADC 21 is allowed to perform oversampling operation, by which the ripple amplitude of the voltage for the first phase is detected. The second and third phases are also measured in the same manner as that for the first phase. A computing unit 15 computes phases for the second and third phases from the voltage ripple amplitudes for the respective phases, by which the phases of PWM units 12 and 13 are adjusted.

By observing the ripple amplitudes of output voltages, ratios $A_{12}$ and $A_{13}$ of inductance values for the second and third phases can be calculated with reference to an inductance value for the first phase. As with the current ripple, the amplitude of the voltage ripple for each phase is inversely proportional to the inductance value. Hence, when the measured values of the voltage ripple amplitudes for the respective phases are $\Delta V_{pp1}$, $\Delta V_{pp2}$, and $\Delta v_{pp3}$, $A_{12}$ and $A_{13}$ are computed as follows:

$$A_{12} = \Delta v_{pp1}/\Delta v_{pp2} \tag{7}$$

$$A_{13} = \Delta v_{pp1}/\Delta v_{pp3} \tag{8}$$

By substituting these values into Equation (1) and Equation (2), phases for the second and third phases can be calculated.

As described above, according to the present embodiment, since output voltages from the power stages are measured individually, ratios $A_{12}$ and $A_{13}$ between inductance values can be computed. Thus, phases for the second and third phases can be calculated.

Fourth Embodiment

Figure 8:
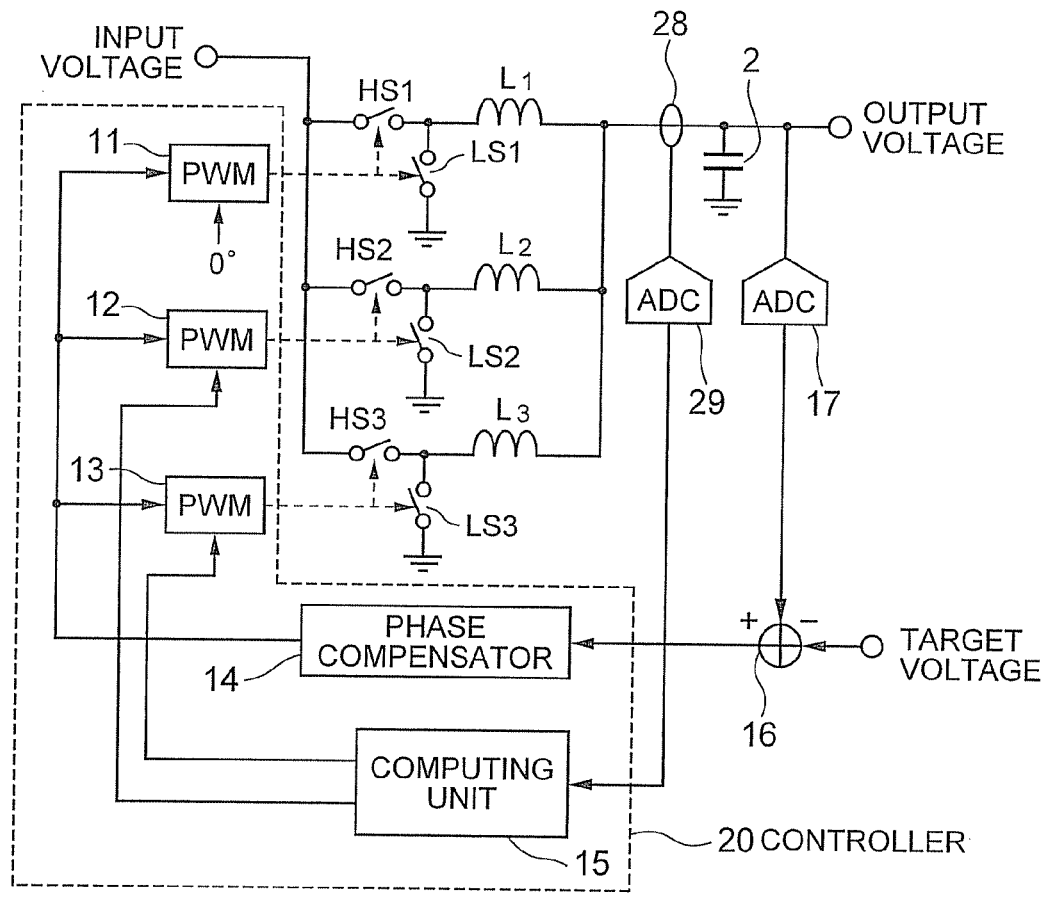
FIG. 8 is a diagram illustrating an exemplary configuration of a three-phase multiphase DC-DC converter according to a fourth embodiment.

FIG. 8 illustrates an exemplary configuration of a DC-DC converter according to a fourth embodiment. A current loop 28 and an ADC 29 are added to the configuration illustrated in FIG. 4. The same components as those in FIG. 4 are denoted by the same reference numerals.

A combined current of inductor currents for all phases is detected by the current loop 28, and the ADC 29 digitizes the combined current and sends the digitized combined current to a computing unit 15. The computing unit 15 measures inductance values for the respective phases by separating the combined current into current ripple amplitudes for the respective phases. Although here description is made of the case of a buck converter, even in the configurations of other converters, the same computation can be performed.

Figure 9:
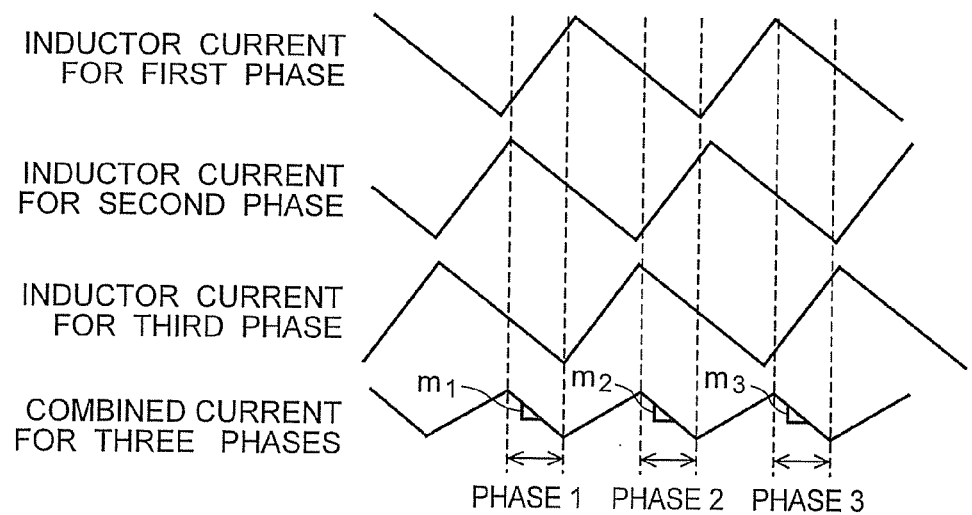
FIG. 9 is a diagram illustrating the transient waveforms of inductor currents for the respective phases.

A specific example is illustrated below. As illustrated in FIG. 9, as three phases (time intervals) having different combinations of positive and negative current slopes between three phases, phase 1, phase 2, and phase 3 are illustrated. In phase 1, the current increases only in the first phase (positive slope) and the current decreases in the other phases (negative slopes). In phase 2, the current increases only in the second phase, and the current decreases in the other phases. In phase 3, the current increases only in the third phase, and the current decreases in the other phases. Slopes $m_1$, $m_2$, and $m_3$ of a combined current in the respective phases are measured. At this time, when the inductance values for the respective phases are $L_1$, $L_2$, and $L_3$, a slope between two ends in each phase is represented by:

$$\begin{cases} m_1 = \frac{V_g - V}{L_1} - \frac{V}{L_2} - \frac{V}{L_3} \\ m_2 = -\frac{V}{L_1} + \frac{V_g - V}{L_2} - \frac{V}{L_3} \\ m_3 = -\frac{V}{L_1} - \frac{V}{L_2} + \frac{V_g - V}{L_3} \end{cases} \quad (9)$$

where Vg is the input voltage and V is the output voltage.

From this Equation (9), a ratio between $L_1$, $L_2$, and $L_3$ is computed as follows:

$$\frac{1}{L_1} : \frac{1}{L_2} : \frac{1}{L_3} = \left(\frac{V_g - 2V}{V} m_1 + m_2 + m_3\right) :$$
$$\left(m_1 + \frac{V_g - 2V}{V} m_2 + m_3\right) : \left(m_1 + m_2 + \frac{V_g - 2V}{V} m_3\right) \quad (10)$$

From here, $A_{12}$ and $A_{13}$ are calculated as follows:

By substituting the values into Equation (1) and Equation (2), phases for the second and third phases can be calculated.

Although in the present embodiment phases 1, 2, and 3 illustrated in FIG. 9 are selected, phases to be selected are not limited thereto. Any three phases may be selected as long as the phases have different combinations of an increase and a decrease in output current between the power stages. When the number of phases is N, N phases are identified and the same computation as that described above is performed.

Fifth Embodiment

Figure 10:
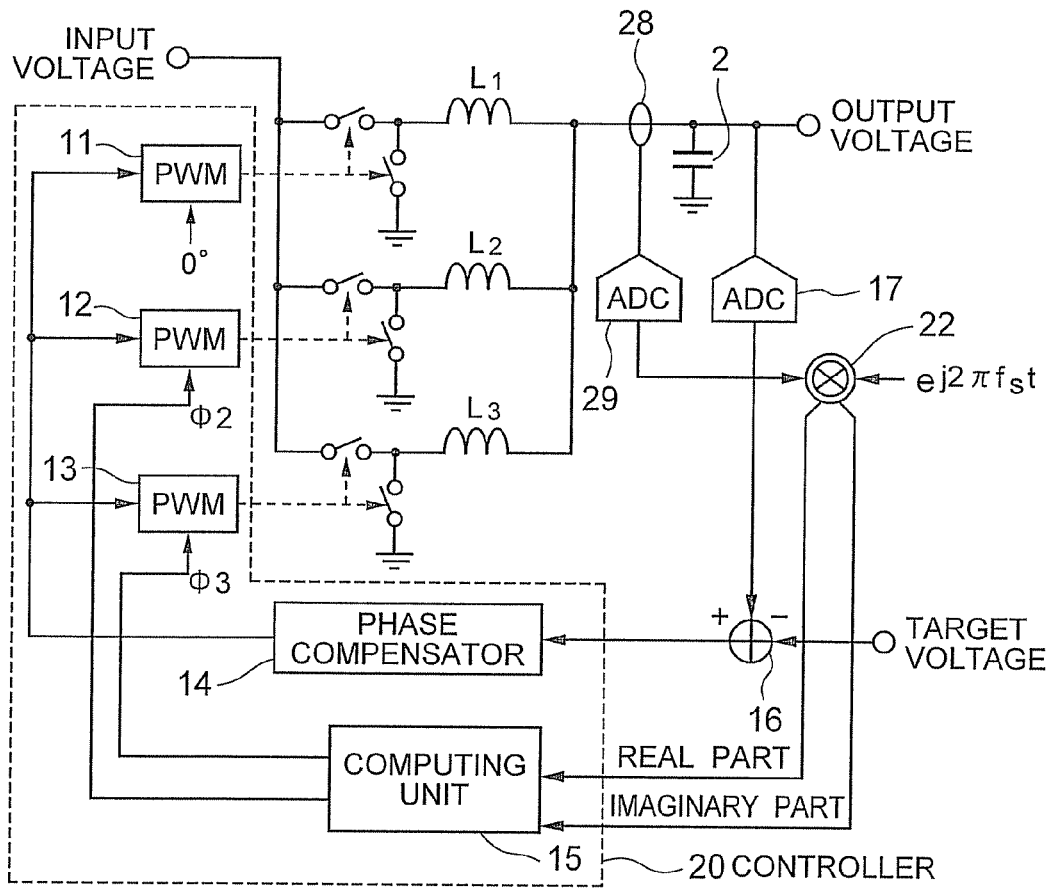
FIG. 10 is a diagram illustrating an exemplary configuration of a three-phase multiphase DC-DC converter according to a fifth embodiment.

FIG. 10 illustrates an exemplary configuration of a DC-DC converter according to a fifth embodiment. A mixer 22 is added to the configuration illustrated in FIG. 9. The same components as those in FIG. 9 are denoted by the same reference numerals.

The present embodiment illustrates the case in which a combined current for phases is detected, and a sin wave and a cos $$A_{12} = \frac{L_2}{L_1} = \frac{(V_g - 2V)m_1 + Vm_2 + Vm_3}{Vm_1 + (V_g - 2V)m_2 + Vm_3} \quad (11)$$

$$A_{13} = \frac{L_3}{L_1} = \frac{(V_g - 2V)m_1 + Vm_2 + Vm_3}{Vm_1 + Vm_2 + (V_g - 2V)m_3} \quad (12)$$

wave of a frequency fs, i.e., $e^{\hat{}}j2\pi f_s t$ (=cos $2\pi f_s t$+j sin $2\pi f_s t$), are input, by which inductance values for the respective phases are measured.

A current loop 28 detects a combined current of inductor currents for the respective phases. An ADC 29 digitizes the combined current and sends the digitized combined current to the mixer 22. The mixer 22 multiplies the combined current of inductor currents by two types of sine waves having a frequency fs and having different phases (orthogonal to each other). For example, the combined current is multiplied by $e^{\hat{}}j2\pi f_s t$ (=cos $2\pi f_s t$+j sin $2\pi f_s t$). A computing unit 15 computes phases for the second and third phases, based on an output signal from the mixer.

First, it is assumed that the phases operate such that the phases are shifted by $2\pi/3$ relative to each other. Here, as illustrated in Equation (13), attention is paid only to a first-order harmonic component of the sum of inductor currents for the respective phases. Note that the first-order harmonic component can be extracted by a low-pass filter.

$$i_L(t) = I_{L1}\sin(2\pi f_s t) + I_{L2}\sin(2\pi f_s t + 2\pi/3) + I_{L3}\sin(2\pi f_s t + 4\pi/3) \quad (13)$$

Note that $I_{L1}$, $I_{L2}$, and $I_{L3}$ indicate the amplitudes of first-order harmonic components of the respective inductor currents. By multiplying a combined current by the above-described sine waves, the following equation is obtained:

$$\begin{aligned} i_L(t)e^{j2\pi f_s t} &= \{I_{L1}\sin(2\pi f_s t) + I_{L2}\sin(2\pi f_s t + 2\pi/3) + \quad (14) \\ &\quad I_{L3}\sin(2\pi f_s t + +4\pi/3)\}e^{j2\pi f_s t} \\ &= \{I_{L1}\sin(2\pi f_s t) + I_{L2}\sin(2\pi f_s t + 2\pi/3) + \\ &\quad I_{L3}\sin(2\pi f_s t + 4\pi/3)\} \\ &\quad (\cos 2\pi f_s t + j\sin 2\pi f_s t) \end{aligned}$$

At this time, DC components (direct-current components) in the real part and the imaginary part are extracted as follows:

$$I_{DC\_RE} = \frac{1}{2}I_{L1}\sin(0) + \frac{1}{2}I_{L2}\sin(2\pi/3) + \frac{1}{2}I_{L3}\sin(4\pi/3) \quad (15)$$

$$I_{DC\_IM} = \frac{1}{2}I_{L1}\cos(0) + \frac{1}{2}I_{L2}\cos(2\pi/3) + \frac{1}{2}I_{L3}\cos(4\pi/3) \quad (16)$$

From here, by solving ratios $A_{12}$ and $A_{13}$ between inductance values for the second and third phases with reference to the first phase, the following equations are obtained:

$$A_{12} = \frac{L_2}{L_1} = 1 + \frac{I_{DC\_RE}}{\sqrt{3}} - I_{DC\_IM} \quad (17)$$

$$A_{13} = \frac{L_3}{L_1} = 1 - \frac{I_{DC\_RE}}{\sqrt{3}} - I_{DC\_MI} \quad (18)$$

By this, a ratio between inductances for fs components for the respective phases can be calculated. By substituting the values into Equation (3) and Equation (4), the amounts of adjustment for the phases (the second and third phases) can be calculated.

Although the case in which the number of phases is three is illustrated here, in the case in which the number of phases is four or more, too, computation can be performed in the same manner.

Sixth Embodiment

Figure 11:
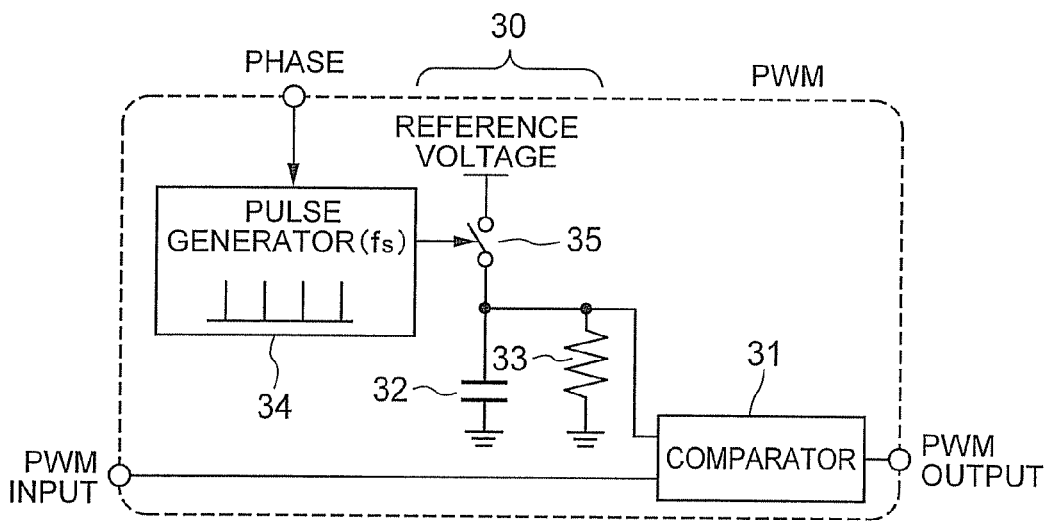
FIG. 11 is a diagram illustrating a first exemplary configuration of a PWM unit.

FIG. 11 illustrates a first exemplary configuration of a PWM unit. FIG. 11 illustrates an exemplary configuration for the case in which a PWM unit is implemented by an analog circuit.

The PWM unit illustrated in FIG. 11 includes a pulse generator 34, a sawtooth wave generator 30, and a comparator 31. The sawtooth wave generator 30 includes a switch 35, a capacitor 32, and a resistor 33. By a parallel connection of the capacitor 32 and the resistor, an RC circuit is formed.

The pulse generator 34 operates at a frequency fs, and the phase of the pulse generator 34 is externally adjustable. When the pulse generator 34 generates a pulse, the switch 35 is turned on, and a reference voltage is short-circuited to an output voltage. When the switch 35 is turned off, the voltage decreases with a slope inversely proportional to the time constant of the RC circuit (the capacitor 32 and the resistor 33). By this, a pulse signal is converted to a sawtooth wave.

The comparator 31 compares an input signal to the PWM unit (a differential signal between an output voltage and a target voltage) with the sawtooth wave, and thereby outputs a pulse width modulated output signal (control signal). For example, a high-level signal is output in an interval where the amplitude of the input signal is greater than or equal to that of the sawtooth wave, and a low-level signal is output in an interval where the amplitude of the input signal is smaller than that of the sawtooth wave.

As described above, by externally adjusting the phase of the pulse generator 34, the phase of a control signal (switch signal) can be adjusted.

Seventh Embodiment

Figure 12:
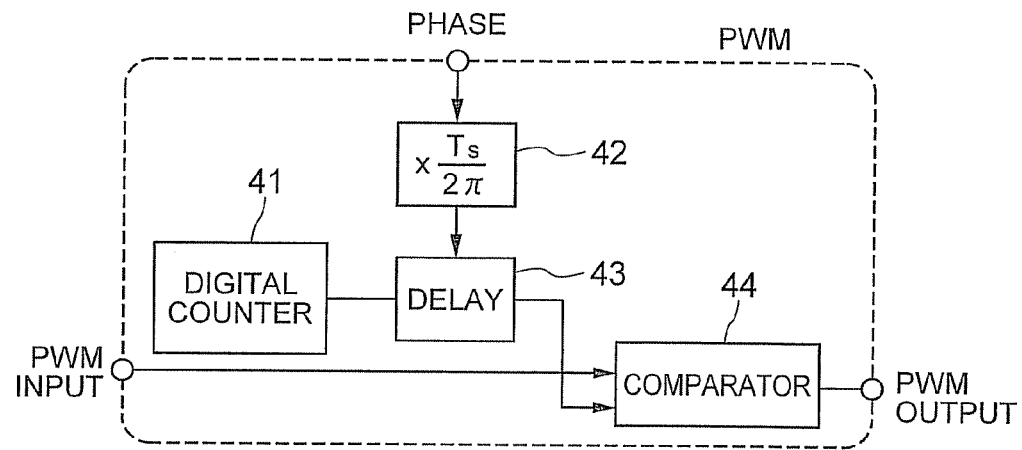
FIG. 12 is a diagram illustrating a second exemplary configuration of a PWM unit.

FIG. 12 illustrates a second exemplary configuration of a PWM unit. FIG. 12 illustrates an exemplary configuration for the case in which a digital PWM unit is implemented by a clock counter.

The PWM unit illustrated in FIG. 12 includes a digital counter 41, an amount-of-delay calculator 42, a delay unit 43, and a comparator 44.

The digital counter 41 is a counter that operates digitally. The digital counter 41 performs counting according to a counter clock, and outputs a count signal indicating a digital counter value. The digital counter 41 digitally generates, by the counter, a signal such as a sawtooth wave illustrated in the sixth embodiment. The amount-of-delay calculator 42 converts a phase [rad] provided externally into the amount of delay which represents time. Specifically, by multiplying the phase provided externally by Ts/2π, an amount of delay is determined. Here, Ts is 1/fs.

The delay unit 43 provides a delay to the count signal from the digital counter 41, according to the amount of delay. By this, the phase of the count signal is adjusted. The count signal provided with the delay is input to the comparator 44.

The comparator 44 compares an input signal to the PWM unit with the digital counter value represented by the count signal, and thereby performs pulse width modulation. For example, a high-level signal is output in an interval where the amplitude of the input signal is greater than or equal to that of the digital counter value, and a low-level signal is output in an interval where the amplitude of the input signal is smaller than that of the digital counter value.

As described above, by adjusting the phase (delay) of a count signal using a phase provided externally, the phase of a control signal can be adjusted.

Eighth Embodiment

Figure 13:
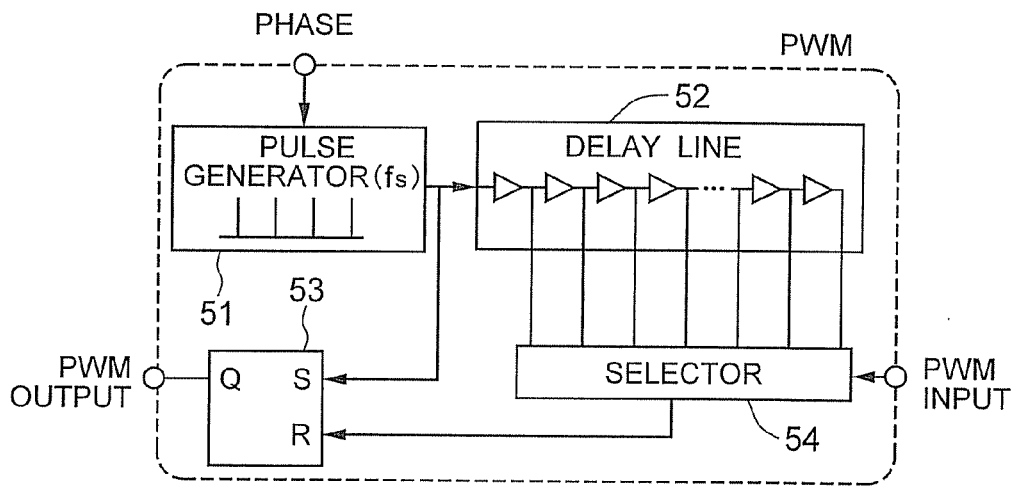
FIG. 13 is a diagram illustrating a third exemplary configuration of a PWM unit.

FIG. 13 illustrates a third exemplary configuration of a PWM unit. FIG. 13 illustrates an exemplary configuration for the case in which a digital PWM unit is implemented by a delay line.

The PWM unit illustrated in FIG. 13 includes a pulse generator 51, a delay line 52, a selector 54, and a set-reset latch 53.

The pulse generator 51 operates at a frequency fs, and the phase of the pulse generator 51 is externally adjustable.

The delay line 52 includes a plurality of delay elements and provides a plurality of amounts of delay to a pulse generated by the pulse generator 51. The delay line 52 outputs pulses having the respective amounts of delay to the selector 54.

The selector 54 selects one of the pulses output from the delay line 52 that has the amount of delay according to an input signal to the PWM unit.

The set-reset latch 53 is set when the pulse generator 51 generates a pulse, and outputs a high-level signal (first control signal) at this time. In addition, the generated pulse is delayed according to the input signal to the PWM unit, and the delayed pulse is input to a reset of the latch 53. At this time, the set-reset latch 53 outputs a low-level signal (second control signal).

As described above, by externally adjusting the phase of the pulse generator 51, the phase of a control signal can be adjusted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A multiphase switching power supply circuit that converts an input voltage to an output voltage different than the input voltage, comprising:
   an input terminal to receive the input voltage;
   an output terminal to output the output voltage;
   a first to an Nth (N being an integer greater than 2) power stages each including an inductor having one end connected to the output terminal; a high-side switch that connects another end of the inductor to the input terminal; and a low-side switch that connects the other end of the inductor to a reference voltage; and
   a switch signal controller to supply first to an Nth control signals to the first to Nth power stages, the first to Nth control signals complementarily turning on and off their corresponding high-side switches and low-side switches at a frequency fs,
   wherein the switch signal controller determines phases of the first to Nth control signals according to a ration between inductance values of the inductors included in the first to Nth power stages.

2. The circuit according to claim 1,
wherein the phases of the first to Nth control signals are shifted in advance by a fixed width relative to each other, and
wherein the switch signal controller adjusts phases of two control signals among the first to Nth control signals.

3. The circuit according to claim 2, wherein the switch signal controller adjusts two control signals among the first to Nth control signals wherein a difference between a phase of a frequency fs component of a combined current of currents output from the power stages and each of phases of the two control signals is closest to 90 degrees among the first to Nth control signals.

4. The circuit according to claim 1,
wherein the first to Nth power stages are selected in turn, and an output voltage from a selected power stage is measured such that the selected power stage operates and operation of all other power stages than the selected power stage is stopped, and
wherein a ratio between the inductance values in the first to Nth power stages is computed based on a ratio between output voltages from the first to Nth power stages.

5. The circuit according to claim 1,
wherein the first to Nth power stages are selected in turn, and an output current from a selected power stage is measured such that the selected power stage operates and operation of all other power stages than the selected power stage is stopped, and
wherein the ratio between the inductance values in the first to Nth power stages is computed based on a ratio between output currents from the first to Nth power stages.

6. The circuit according to claim 1,
wherein in N time intervals each of which has a different combination of increase and decrease of output currents from the first to Nth power stages, slopes of a combined current of currents output from the first to Nth power stages are measured, respectively, and
wherein the ratio between the inductance values in the first to Nth power stages is computed based on the slopes measured in the N time intervals.

7. The circuit according to claim 1, further comprising a mixer to multiply a combined current of currents output from the first to Nth power stages by two sine waves having the frequency fs in an orthogonal relationship,
wherein the ratio between the inductance values in the first to Nth power stages is computed based on direct-current components of resultant signals output from the mixer.

8. The circuit according to claim 1,
wherein the switch signal controller includes, for each of the first to Nth power stages, a pulse width modulator including:
a pulse generator to generate a pulse at a frequency fs;
a sawtooth wave generating circuit to generate a sawtooth wave in response to generation of the pulse; and
a comparator to generate a control signal by comparing the sawtooth wave with a difference between the output voltage and a target voltage, and
wherein the switch signal controller adjusts a phase of the pulse generated by the pulse generator included in the pulse width modulator in each of the power stages so that a phase of the control signal supplied to each of the power stages is adjusted.

9. The circuit according to claim 1,
wherein the switch signal controller includes, for each of the first to Nth power stages, a pulse width modulator including:
a digital counter to perform counting according to a clock and generate a count signal indicating a count value;
a delay unit to delay the count signal; and
a comparator to generate the control signal by comparing the count signal delayed by the delay unit with a difference between the output voltage and a target voltage, and
wherein the switch signal controller adjusts a delay provided by the delay unit to thereby a phase of the control signal.

10. The circuit according to claim 1,
wherein the switch signal controller includes, for each of the first to Nth power stages, a pulse width modulator including:
a pulse generator to generate a pulse at a frequency fs;
a latch to output the control signal of a first level in response to generation of the pulse; and
a selector to provide the pulse delayed by an amount of delay depending on a difference between the output voltage and a target voltage to the latch,
wherein the latch outputs the control signal of a second level in response to an input of the pulse provided by the selector, and
wherein the switch signal controller adjusts a phase of the pulse generated by the pulse generator to thereby adjust a phase of the control signal.

* * * * *